United States Patent
K et al.

(10) Patent No.: US 9,699,093 B2
(45) Date of Patent: Jul. 4, 2017

(54) MIGRATION OF VIRTUAL MACHINE BASED ON PROXIMITY TO PERIPHERAL DEVICE IN NUMA ENVIRONMENT

(71) Applicant: Dell Products L.P., Round Rock, TX (US)

(72) Inventors: Krishnaprasad K, Karnataka (IN); Mahesh Vellore Chandramouli, Karnataka (IN); Shiva Prasad Katta, Karnataka (IN)

(73) Assignee: Dell Products L.P., Round Rock, TX (US)

( * ) Notice: Subject to any disclaimer, the term of this patent is extended or adjusted under 35 U.S.C. 154(b) by 307 days.

(21) Appl. No.: 13/916,044

(22) Filed: Jun. 12, 2013

(65) Prior Publication Data

US 2014/0373006 A1     Dec. 18, 2014

(51) Int. Cl.
  *G06F 9/455*     (2006.01)
  *H04L 12/851*    (2013.01)
  *H04L 12/725*    (2013.01)
  *H04L 12/721*    (2013.01)
  *H04L 29/08*     (2006.01)
  *H04L 29/06*     (2006.01)

(52) U.S. Cl.
  CPC ........ *H04L 47/2408* (2013.01); *H04L 45/306* (2013.01); *H04L 45/308* (2013.01); *H04L 45/38* (2013.01); *H04L 67/02* (2013.01); *H04L 63/101* (2013.01)

(58) Field of Classification Search
  CPC ..................... G06F 9/45533; G06F 2009/4557
  See application file for complete search history.

(56) References Cited

U.S. PATENT DOCUMENTS

| | | | |
|---|---|---|---|
| 2007/0006227 A1* | 1/2007 | Kinney | G06F 9/544 718/1 |
| 2007/0226449 A1* | 9/2007 | Akimoto | G06F 9/5077 711/170 |
| 2008/0162873 A1* | 7/2008 | Zimmer | G06F 15/17337 712/22 |

(Continued)

OTHER PUBLICATIONS

Luck, Tony, "*Linux Scalability in a NUMA World*", Linux Magazine, linux-mag.com/id/6868, 6 pages, Sep. 14, 2008.

*Primary Examiner* — James J Lee
(74) *Attorney, Agent, or Firm* — Baker Botts L.L.P.

(57) ABSTRACT

In one embodiment, a system includes a device and first and second processors. The first and second processors are configured to access first information. The first information includes a first parameter and a second parameter. The first parameter is associated with a position of the device relative to the first processor. The second parameter is associated with a position of the device relative to the second processor. The system is configured to access second information associated with a virtual machine. The virtual machine is configured to run on a host operating system. The virtual machine includes a guest operating system configured to communicate with the device. The system is also configured to automatically select the first processor based at least on the first information and the second information and to associate the virtual machine with the first processor in response to automatically selecting the first processor.

21 Claims, 4 Drawing Sheets

(56) References Cited

U.S. PATENT DOCUMENTS

| | | | |
|---|---|---|---|
| 2009/0138887 A1* | 5/2009 | Uehara | G06F 9/5077 718/104 |
| 2010/0192149 A1* | 7/2010 | Lathrop | G06F 1/3203 718/1 |
| 2010/0250868 A1* | 9/2010 | Oshins | G06F 12/0284 711/154 |
| 2010/0332635 A1* | 12/2010 | Rogel | G06F 9/45533 709/223 |
| 2012/0151483 A1* | 6/2012 | Belay | 718/1 |
| 2012/0162234 A1* | 6/2012 | Blinzer | G06T 1/20 345/501 |
| 2012/0254866 A1* | 10/2012 | Iwamatsu | G06F 9/45558 718/1 |
| 2013/0073730 A1* | 3/2013 | Hansson | G06F 9/5044 709/226 |
| 2014/0007097 A1* | 1/2014 | Chin | G06F 9/45533 718/1 |
| 2014/0012940 A1* | 1/2014 | Joshi | G06F 9/45558 709/214 |
| 2014/0245295 A1* | 8/2014 | Tsirkin et al. | 718/1 |
| 2014/0282500 A1* | 9/2014 | Parthiban | G06F 9/45533 718/1 |

* cited by examiner

MIGRATION OF VIRTUAL MACHINE BASED ON PROXIMITY TO PERIPHERAL DEVICE IN NUMA ENVIRONMENT

TECHNICAL FIELD

This disclosure relates generally to computer systems and more particularly to a system and method for virtual machine management.

BACKGROUND

As the value and use of information continues to increase, individuals and businesses seek additional ways to process and store information. One option available to these users is an information handling system or computing system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

The information handling system may include multiple processors connected to various devices, such as Peripheral Component Interconnect ("PCI") devices and PCI express ("PCIe") devices. The operating system may include one or more drivers configured to facilitate the use of the devices.

The information handling system may also run one or more virtual machines, which may include a guest operating system. Virtual machines may be managed by a virtual machine manager, such as, for example, a hypervisor. Certain virtual machines may be configured for device passthrough, such that the guest operating system of the virtual machine may utilize a physical device directly without requiring the intermediate use of the host operating system's drivers.

Current information handling systems may benefit from increased performance of virtual machines as their utilization increases. Improved performance may also benefit systems where multiple virtual machines operate concurrently. Current information handling systems may also have a need for more efficient utilization of computing resources.

SUMMARY

In one embodiment, a system includes a device and first and second processors. The first and second processors are configured to access first information. The first information includes a first parameter and a second parameter. The first parameter is associated with a position of the device relative to the first processor. The second parameter is associated with a position of the device relative to the second processor. The system is configured to access second information associated with a virtual machine. The virtual machine is configured to run on a host operating system. The virtual machine includes a guest operating system configured to communicate with the device. The system is also configured to automatically select the first processor based at least on the first information and the second information and to associate the virtual machine with the first processor in response to automatically selecting the first processor.

In some embodiments, the virtual machine may be configured to communicate with the device without utilizing a driver of the host operating system. The first parameter may be a distance between the device and the first processor. The second parameter may be a distance between the device and the second processor. The first information may include a System Locality Information Table. In some embodiments, the virtual machine may be associated with a processor other than the first processor before the association of the virtual machine with the first processor. The association of the virtual machine with the first processor may cause instructions initiated by the virtual machine to be executed by the first processor.

In another embodiment, a method includes accessing first information. The first information includes a first parameter and a second parameter. The first parameter is associated with a position of the device relative to the first processor. The second parameter is associated with a position of the device relative to the second processor. The method also includes accessing second information associated with a virtual machine. The virtual machine is configured to run on a host operating system. The virtual machine includes a guest operating system configured to communicate with the device. The method also includes automatically selecting the first processor based at least on the first information and the second information and associating the virtual machine with the first processor in response to automatically selecting the first processor.

Depending on the specific features implemented, particular embodiments may exhibit some, none, or all of the following technical advantages. Certain embodiments may allow for the use of device proximity information. Another technical advantage may include optimizing virtual machine performance in a virtualized environment. Yet another technical advantage may involve allowing virtual machines to communicate more efficiently with underlying physical devices by avoiding virtual-physical translation overheads.

BRIEF DESCRIPTION OF THE DRAWINGS

Reference is now made to the following description taken in conjunction with the accompanying drawings, wherein like reference numbers represent like parts.

DESCRIPTION OF EXAMPLE EMBODIMENTS

Figure 1:
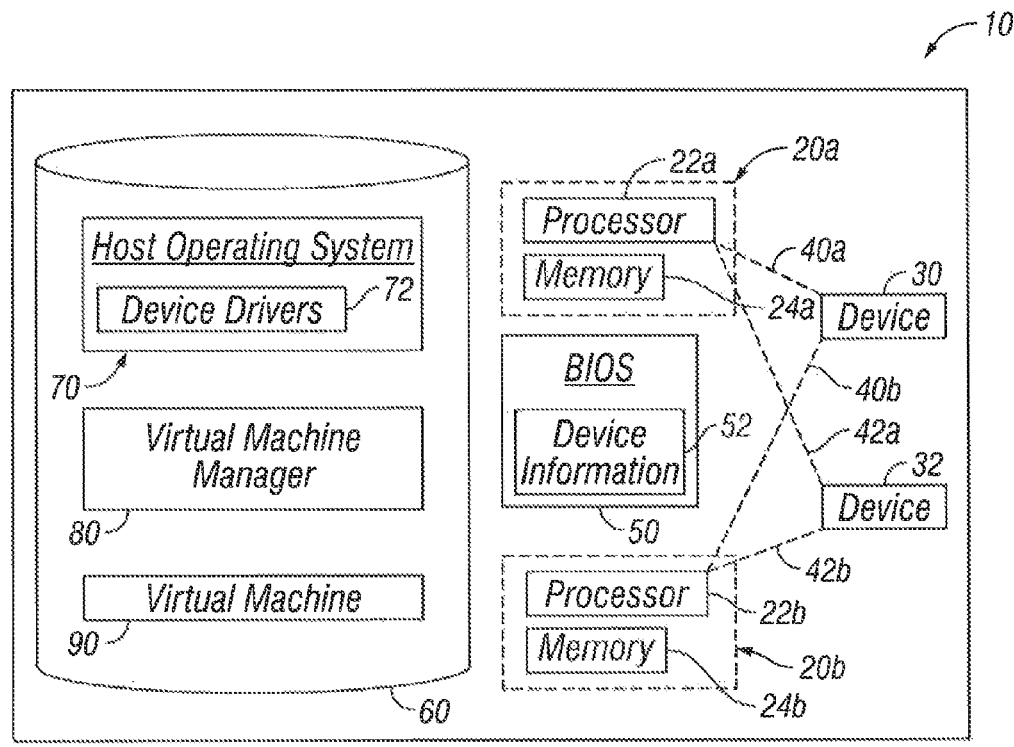
FIG. 1 illustrates one embodiment of an information handling system that facilitates virtual machine management.

FIG. 1 illustrates one embodiment of information handling system 10 that facilitates virtual machine management. Information handling system 10 includes non-uniform memory access ("NUMA") nodes 20a and 20b, devices 30 and 32, basic input/output system ("BIOS") 50, and memory 60. NUMA node 20a includes processor 22a and memory 24a, and NUMA node 20b includes processor 22b and memory 24b. BIOS 50 includes device information 52. Memory 60 includes host operating system 70 (which includes device drivers 72), virtual machine manager 80, and virtual machine 90. Information handling system 10 may include any suitable number, type, interconnection, and/or configuration of these components.

In some embodiments, information handling system 10 utilizes position information, such as device information 52, relating to the positions of processors 22a and 22b relative to devices 30 and 32 to provide improved virtual machine performance. Upon selecting one of processors 22a or 22b, information handling system 10 associates virtual machine 90 with the selected processor such that the operations of virtual machine 90 are executed by the selected processor. In some embodiments, associating virtual machines with processors in this manner may provide improved performance in virtualized environments.

Information handling system 10 includes any suitable components that facilitate virtual machine management. Information handling system 10 may include a network server, remote server, mainframe, host computer, workstation, web server, personal computer, file server, data center, smart phone, tablet computer, or any other suitable computing device. Information handling system 10 may also include any suitable component that functions as a computing device.

In some embodiments, NUMA nodes 20a and 20b represent an association of a processor and memory accessible by that processor. In the depicted embodiment, NUMA node 20a includes processor 22a and memory 24a, and NUMA node 20b includes processor 22b and memory 24b. A NUMA node may include a processor and memory associated with or allocated to that processor. A NUMA node may also include configuration information and/or a configuration space in memory for one or more devices (e.g. devices 30 and 32).

In some embodiments, processors 22a and 22b may include any hardware, firmware, and/or software that operates to control and process information. For example, processor 22a may execute instructions to facilitate the operation of devices 30 and 32. Processor 22a may also execute instructions associated with configuration modules 308 or 410 (shown in FIGS. 3 and 4, respectively), to control the management one or more virtual machines. Processor 22a may be a programmable logic device, a microcontroller, a microprocessor, any suitable processing device, or any suitable combination thereof. Processor 22a may also be a processor core of a multi-core processor. Processor 22b may include of the components and may perform any of the functions described above with respect to processor 22a. Processor 22b may be the same type of processor as processor 22a, or it may be a different type of processor. Furthermore, processors 22a and 22b may operate in conjunction with one another (such as, for example, in a parallel processing environment), or they may operate independently.

In some embodiments, memories 24a, 24b, and 60 may include one or more of volatile, nonvolatile, local, and/or remote devices suitable for storing information. For example, memories 24a and 24b may include random access memory (RAM), read only memory (ROM), any type of processor cache, flash memory, magnetic storage devices, optical storage devices, network storage devices, cloud storage devices, solid state devices, any other suitable information storage device, or any suitable combination of these devices. Memory 24a is accessible to processor 22a and may be accessible to processor 22b, though processors 22a and 22b may have different access times, positions, and/or routes to memory 24a. Similarly, memory 24b is accessible to processor 22b and may be accessible to processor 22a, though processors 22a and 22b may have different access times, positions, and/or routes to memory 24b. Memories 24a and 24b may include portions, or all, of memory 60. For example, memory 24a may include a processor cache for processor 22a, portions of RAM accessible to processor 22a, as well as certain portions of memory 60. Similarly, memory 24b may include a processor cache for processor 22b, portions of RAM accessible to processor 22b, as well as certain additional portions of memory 60.

In some embodiments, devices 30 and 32 may include any suitable hardware, firmware, and/or software component of information handling system 10. Devices 30 or 32 may connect to a motherboard of information handling system 10 via a physical interface that is connected to processors 22a and 22b via one or more communication pathways, such as a bus. For example, devices 30 or 32 may be PCI devices or PCIe devices. Devices 30 and 32 may include graphics processing units ("GPUs"), sound cards, network cards, or any other suitable device. In some embodiments, devices 30 and 32 may be virtual devices (e.g., a virtual network card or virtual GPU).

In some embodiments, position indicators 40a and 40b represent a position of device 30 relative to processors 22a and 22b, respectively. Position indicators 40a and 40b may indicate a distance between device 30 and processors 22a and 22b, respectively. For example, position indicators 40a may indicate a physical distance between device 30 and processor 22a, such as, for example, a distance between the components along one or more buses or communication channels. Position indicators 40a and 40b may also indicate timing of communications between device 30 and processors 22a and 22b, respectively. For example, position indicator 40b may indicate the amount of time required for a communication from processor 22b to reach device 30, the amount of time required for a communication from device 30 to reach processor 22b, or any other suitable timing information.

In some embodiments, position indicators 42a and 42b represent a position of device 32 relative to processors 22a and 22b, respectively. Position indicators 42a and 42b may include any type of information described above with respect to position indicators 40a and 40b.

In some embodiments, BIOS 50 may be implemented using one or more of hardware, software, firmware, any other suitable component, or any interface thereof that operates to initialize and/or test one or more components of information handling system 10. BIOS 50 may also facilitate the loading of one or more operating systems, such as host operating system 72 or guest operating system 402 (shown in FIG. 4). BIOS 50 may store various data about information handling system 10 and may communicate one or more aspects of that data to one or more components of information handling system 10, such as host operating system 72. In the depicted embodiment, BIOS 50 includes device information 52.

In some embodiments, device information 52 is information associated with devices 30 and 32. For example, device information 52 may include parameters associated with position indicators 40a, 40b, 42a, and 42b. As another example, device information 52 includes a table indicating one or more respective distances between devices 30 and 32 and processors 22a and 22b. This table may be a System Locality Information Table ("SLIT"). The configuration and use of such information may be defined by an interface, such as, for example, the Advanced Configuration and Power Interface ("ACPI"). Other suitable interfaces may be used. SLIT information, which may be included as part of ACPI, may describe the distance between one or more processors, memory controllers, and host bridges (e.g., PCIe slots). SLIT information may be read by a hypervisor (e.g., virtual machine manager 80) using one or more methods defined by the ACPI specification. This SLIT information may be used to select a processor to associate with virtual machine 90. For example, virtual machine manager 80 may determine whether virtual machine 90 is configured to communicate with a device (e.g., device 30 or 32) and, if so, read the SLIT information and select a NUMA node that is closest to the physical slot (e.g., a PCIe slot) where the device is installed.

In some embodiments, memory 60 includes host operating system 70, virtual machine manager 80, and virtual machine 90. Any of these components may be distributed and/or duplicated across multiple memory devices in information handling device 10 or in other devices. While illustrated as including particular components, memory 60 may include any suitable information for use in the operation of information handling device 10.

In some embodiments, host operating system 70 can be any operating system that operates to host one or more virtual machines. Host operating system 70 may include LINUX, IBM's zSeries/Operating System (z/OS), MS-DOS, PC-DOS, MAC-OS, APPLE IOS, ANDROID, WINDOWS, UNIX, OpenVMS, an embedded operating system, or any other suitable operating system. Operating system 70 may include a kernel that operates to manage the interaction between software instructions and the processor executing those instructions. Operating system 70 may communicate with BIOS 50. For example, operating system 70 may access one or more portions of device information 52 via any suitable mechanism.

In some embodiments, host operating system 70 includes one or more device drivers 72. Device drivers 72 may be implemented using any suitable software or firmware. Device drivers 72 may be used by an operating system or other component to operate or control one or more of devices 30 and 32. Device drivers 72 may communicate data to and receive data from one or more of devices 30 and 32. For example, a device driver 72 may issue commands to device 30.

In some embodiments, virtual machine manager 80 may be implemented using any software, firmware, other instructions, and/or other information that can control one or more virtual machines, such as virtual machine 90. As an example, one or more portions of virtual machine manager 80 may be included in, or may be installed in, a kernel of host operating system 70. As another example, one or more portions of virtual machine manager 80 may operate as an application outside of a kernel of host operating system 70. As another example, one or more portions of virtual machine manager 80 may be included in, or may be installed in, a kernel of host operating system 70, while one or more other portions of virtual machine manager 80 operate as an application outside of the kernel. Virtual machine manager 80 may be a hypervisor. Examples of implementations of virtual machine manager 80 include VMWARE, VIRTUALBOX, PARALLELS and XEN.

In some embodiments, virtual machine 90 may be implemented using any instructions and/or information that operates as a software-implemented information handling system. Virtual machine 90 may include various software-implemented components that emulate physical components. For example, virtual machine 90 may include virtual processors, virtual network interfaces, or any other software-implemented component. Examples of implementations of virtual machine 90 include virtual machine solutions from VMWARE, VIRTUALBOX, PARALLELS, and XEN.

In some embodiments, virtual machine 90 may be associated with a particular processor, such as processor 22a or 22b, such that instructions initiated by virtual machine 90 are executed by the associated processor. For example virtual machine 90 may be associated with NUMA node 20a. In certain embodiments, associating virtual machine 90 with a particular processor may cause instructions initiated by virtual machine 90 to be executed by the associated processor. Virtual machine 90 may also be migrated from one information handling system 10 to another, or migrated between certain components of information handling system 10. For example, virtual machine 90 may be initially associated with processor 22a or NUMA node 20a, and virtual machine manager 80 may migrate virtual machine 90 such that virtual machine 90 is then associated with processor 22b or NUMA node 20b.

In some embodiments, host operating system 70, virtual machine manager 80, and/or virtual machine 90 may access one or more portions of device information 52. For example, in embodiments utilizing a LINUX operating system, an "acpi_table_slit" structure that includes portions of device information 52 provided by BIOS 50 may be available to host operating system 70. Host operating system 70 may parse this SLIT information using an "acpi_parse_slit( )" function, validate it using a "slit_valid( )" function, and initialize it using an "acpi_numa_slit_init( )" function. These functions, or similar functions, may also be available to virtual machine manager 80. For example, these functions, or similar functions, may be defined for a hypervisor and stored in a kernel buffer. A userspace program may then read one or more portions of device information 52 from the kernel buffer (e.g., by using a "copy_to_user" function) and transfer the received data from the kernel buffer to virtual machine 90 (e.g., by using one or more sockets).

In some embodiments, virtual machine 90 may use the SLIT information received in the above example to select a processor and facilitate association of virtual machine 90 with the selected processor. For example, after virtual machine 90 receives one or more portions of device information 52, an interrupt request ("IRQ") balance daemon of a guest operating system of virtual machine 90 (e.g., guest operating system 402 of FIG. 4) may utilize the received data to send alerts to virtual machine manager 80 regarding migration of virtual machine 90. For example, a guest operating system of virtual machine 90 (e.g., guest operating system 402 of FIG. 4) may notify virtual machine manager 80 to request that virtual machine 90 be associated with a processor (e.g., processor 22a or 22b) that is nearer to a particular device (e.g., device 30 or 32). If virtual machine 90 is not associated with the selected processor, virtual machine manager 80 may then initiate migration of virtual machine 90 to the selected processor.

In some embodiments, processor 22a or 22b may execute the processing steps that associate virtual machine 90 with the selected processor. For example, processor 22a may execute instructions communicated by virtual machine manager 80 to associate virtual machine 90 with either processor 22a or 22b. In other embodiments, one or more additional processors may execute the instructions to associate virtual machine 90 with processor 22a or 22b.

Figure 2:
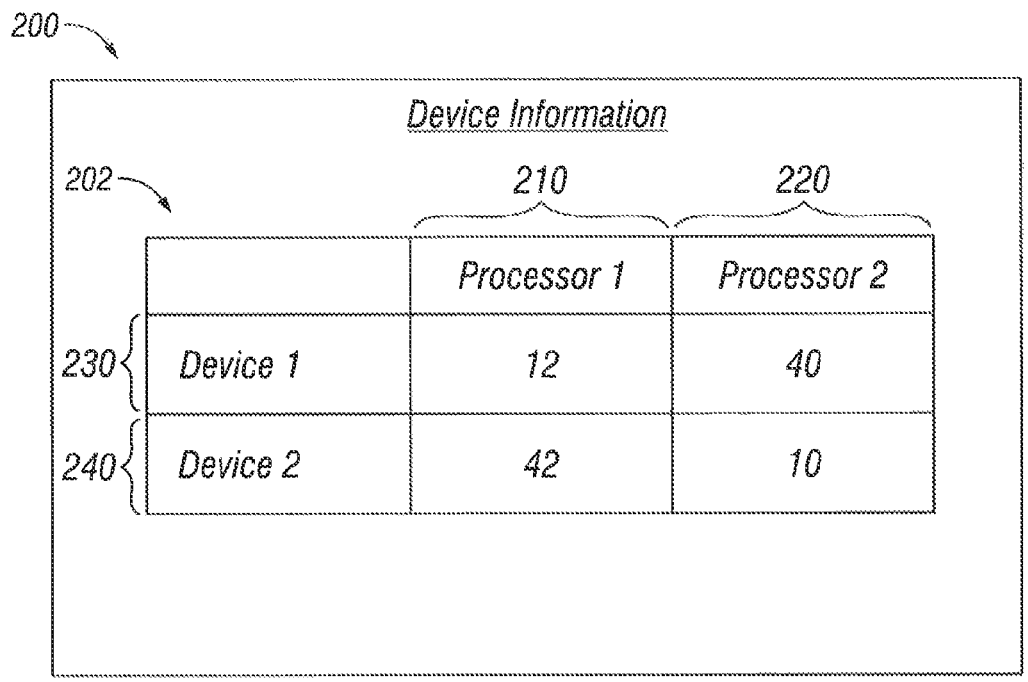
FIG. 2 illustrates one embodiment of device information that may be used in the operations of the information handling system depicted in FIG. 1.

FIG. 2 illustrates one embodiment of device information 200 that may be used in the operations of the information handling system 10. For example, one or more aspects of device information 200 may be used to implement device information 52. As depicted, device information 200 includes table 202, which may be a SLIT.

In some embodiments, table 202 includes columns 210 and 220 and rows 230 and 240. Columns 210 and 220 include information indicating a position of a processor relative to one or more devices. Rows 230 and 240 include information indicating a position of a device relative to one or more processors. For example, referring to FIG. 1, column 210 may be associated with processor 22a, column 220 may be associated with processor 22b, row 230 may be associated with device 30, and row 240 may be associated with device 32. In this example, "12," shown at the intersection of column 210 and 230, represents the position of processor 22a relative to device 30 (i.e., position indicator 40a). Similarly, "42" represents the position of processor 22a relative to device 32 (e.g., position indicator 42a), "40" represents the position of processor 22b relative to device 30 (e.g., position indicator 40b), and "10" represents the position of processor 22a relative to device 32 (e.g., position indicator 42b). Table 202 may include information for any number of processors and/or devices. Furthermore, table 202 may include any type of information discussed above in reference to device information 52 (e.g., distances or times).

Figure 3:
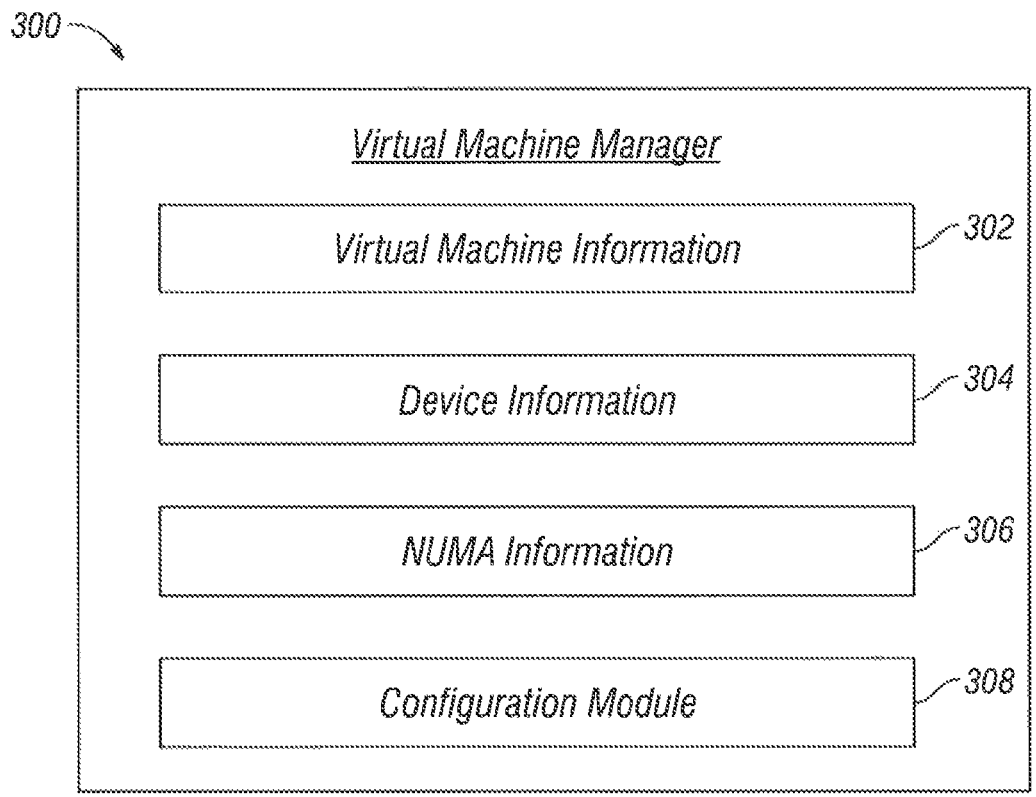
FIG. 3 illustrates one embodiment of a virtual machine manager that may be used in the operations of the information handling system depicted in FIG. 1.

FIG. 3 illustrates one embodiment of virtual machine manager 300 that may be used in the operations of the information handling system 10 of FIG. 1. For example, one or more aspects of virtual machine manager 300 may be used to implement virtual machine manager 80. Virtual machine manager 300 includes virtual machine information 302, device information 304, NUMA information 306, and configuration module 308.

In some embodiments, virtual machine information 302 is any suitable information that is associated with a virtual machine managed by virtual machine manager 300, such as driver information, capability information, or configuration information. For example, virtual machine information 302 may include information indicating that a virtual machine is configured for "device passthrough" functionality, such as "PCI passthrough" or "PCIe passthrough." Device passthrough functionality may enable guest operating system 402 to communicate with devices (e.g., devices 30 or 32 of FIG. 1) without utilizing device drivers (e.g., device drivers 72) of a host operating system (e.g. host operating system 70 of FIG. 1). Virtual machine information 302 may be stored as part of virtual machine manager 300, or it may be accessed from a portion of a virtual machine being managed by virtual machine manager 300. For example, virtual machine manager 300 may access a parameter, which may be stored temporarily or permanently, indicating that a virtual machine managed by virtual machine manager 300 is configured for device passthrough.

In some embodiments, device information 304 may be information associated with devices that may communicate with a virtual machine (such as devices 30 or 32 of FIG. 1). Device information 304 may include any suitable information and may perform any function described above in reference to device information 52 of FIG. 1 or device information 200 of FIG. 2. Device information 304 may be communicated to virtual machine manager 300 by a host operating system. For example, virtual machine manager 300 may request device information from operating system 70, and virtual machine manager 300 may store that information as device information 304.

In some embodiments, NUMA information 306 may be any suitable information that is associated with one or more NUMA nodes. For example, NUMA information may include information associated with NUMA nodes 20a and 20b of FIG. 1. Virtual machine manager 300 may utilize NUMA information 306 when associating a virtual machine with a particular NUMA node.

In some embodiments, configuration module 308 represents any suitable computer code, parameters, or instructions that facilitate the association of a virtual machine with a processor. In some embodiments, configuration module 308 can select a processor to associate with a virtual machine managed by virtual machine manager 300 based on virtual machine information 302 and device information 304. For example, configuration module 308 may access virtual machine information 302 and identify that a virtual machine is configured for device passthrough for device 30 of FIG. 1. Configuration module 308 may then access parameters from device information 304 that indicate the position of device 30 relative to processors 22a and 22b. For example, configuration module 308 may access table 202 of FIG. 2 directly or indirectly. Based on these parameters, configuration module 308 may select a processor to associate with the virtual machine. For example, configuration module 308 may analyze the parameters and determine that processor 22a is able to access device 30 faster than processor 22b is, causing configuration module 308 to select processor 22a. Configuration module 308 may also consider various additional factors, such as resource availability and policy guidelines, in selecting a processor.

In some embodiments, configuration module 308 may operate to associate a virtual machine with a processor. For example, after selecting a processor for a virtual machine, configuration module 308 may cause instructions initiated by the virtual machine to be executed by the selected processor. In some embodiments, this may involve associating the virtual machine to a NUMA node (e.g., NUMA node 20a of FIG. 1). Such operations may help optimize performance in a virtualized environment using device proximity information. This may be achieved by enabling virtual machines to communicate more efficiently with underlying physical devices.

Figure 4:
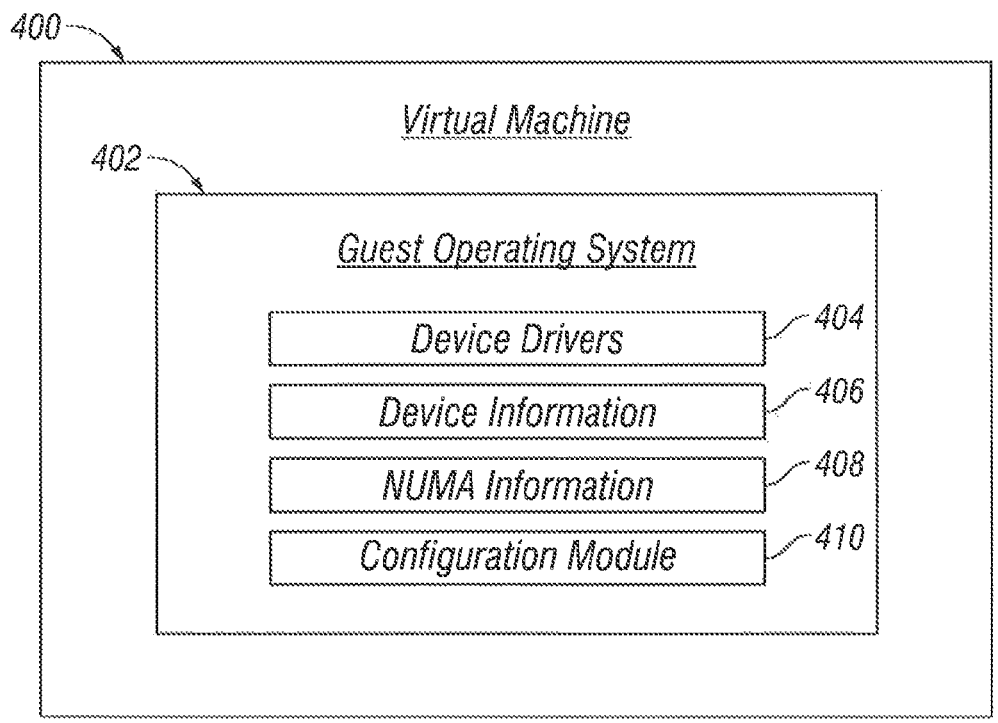
FIG. 4 illustrates one embodiment of a virtual machine that may be used in the operations of the information handling system depicted in FIG. 1.

FIG. 4 illustrates one embodiment of virtual machine 400 that may be used in the operations of information handling system 10. As depicted, virtual machine 400 includes guest operating system 402. Virtual machine 400 may also include virtualized physical components of information handling systems. For example, virtual machine 400 may include virtual processors, virtual memories, virtual devices, a virtual BIOS, or any other suitable virtualized component. Information handling system 10 may include any suitable number of virtual machines 400, which may or may not be of the same type or have the same configuration. For example, one virtual machine 400 may be configured for passthrough communication with device 30 while another virtual machine 400 may be configured for passthrough communication with device 32.

In some embodiments, guest operating system 402 may include any component and may perform any function described above in reference to operating system 70. A guest operating system may be any operating system that executes on top of an underlying host operating system or executes as part of a virtual machine. Guest operating system 402 may communicate with other components of virtual machine 400, virtual machine manager 300 of FIG. 3, or any other suitable component to facilitate the operations described herein. Guest operating system 402 may include device drivers 404, device information 406, NUMA information 408, and configuration module 410.

In some embodiments, device drivers 404 may be implemented using any suitable software or firmware. Device drivers 404 may be used by an operating system or other component to operate, control, or communicate with one or more of devices 30 and 32. Device drivers 404 may include any of the components and may perform any of the functions described above in reference to device drivers 72. Device drivers 404 may also facilitate "device passthrough" functionality, such as "PCI passthrough" or "PCIe passthrough." For example, device drivers 404 may enable guest operating system 402 to communicate with device 30 or 32 without utilizing device drivers 72. Enabling such passthrough functionality may allow virtual machine 400 to communicate with devices 30 and 32 without virtual-physical translation overheads.

In some embodiments, device information 406 may include information associated with devices such as devices 30 and 32 of FIG. 1. Device information 406 may include any information and may perform any function described above in reference to device information 304 of FIG. 3. Device information 406 may be communicated to virtual machine 400 by virtual machine manager 300. For example, virtual machine 400 may request device information 304 from virtual machine manager 300, and virtual machine 400 may store that information as device information 406.

In some embodiments, NUMA information 408 represents any suitable information that is associated with one or more NUMA nodes. NUMA information 408 may include any component and perform any function described above in reference to NUMA information 306 of FIG. 3.

In some embodiments, configuration module 410 may be implemented using any suitable computer code, parameters, or instructions that facilitate the association of virtual machine 400 with a processor or NUMA node. Configuration module 410 may include any of the components and may perform any of the functions described above in reference to configuration module 308. In some embodiments, configuration module 410 may select the processor with which virtual machine 400 is to be associated.

Figure 5:
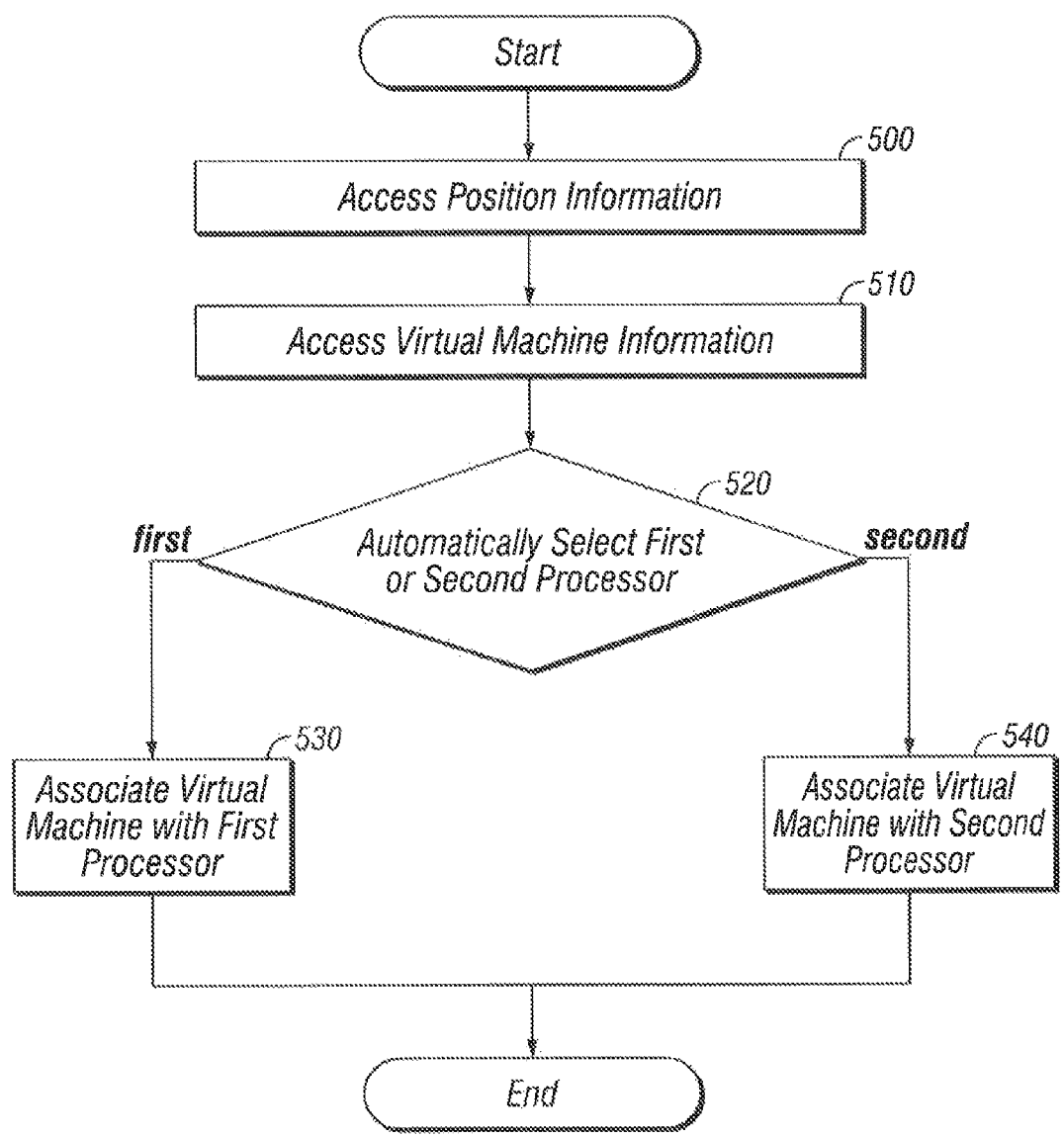
FIG. 5 is a flowchart illustrating one embodiment of managing a virtual machine.

FIG. 5 is a flowchart illustrating one embodiment of managing a virtual machine. Particular embodiments may repeat the steps of FIG. 5, where appropriate. Moreover, although this disclosure describes and illustrates particular steps in FIG. 5 as occurring in a particular order, this disclosure contemplates any suitable steps in FIG. 5 occurring in any suitable order. Furthermore, the steps of FIG. 5 may be performed at different times during the operation of information handling system 10. For example, these steps may be performed when information handling system 10 is initialized, when virtual machine manager 80 is initialized, when virtual machine 90 is initialized, or at any suitable point during the subsequent operation of these components.

In some embodiments, these steps are carried out using one or more components of FIGS. 1-4. Furthermore, although this disclosure describes and illustrates particular components, devices, or systems carrying out particular steps in FIG. 5, this disclosure contemplates any suitable combination of any suitable components, devices, or systems carrying out any suitable steps in FIG. 5.

At step 500, in some embodiments, information handling system 10 accesses position information associated with processors 22a and 22b and devices 30 and 32. Information handling system 10 may access parameters described as part of device information 52 or device information 200 using any suitable mechanism. For example, information handling system may access SLIT information. The accessed information may indicate the proximity of processors 22a and 22b to devices 30 and 32.

In some embodiments, virtual machine manager 80 may access and/or communicate one or more portions of device information 52, 200, or 304. For example, in embodiments utilizing a LINUX operating system, an "acpi_table_slit" structure, which includes portions of device information 52 provided by BIOS 50, may be available to host operating system 70. Host operating system 70 may parse this SLIT information using an "acpi_parse_slit( )" function, validate it using a "slit_valid( )" function, and initialize it using an "acpi_numa_slit_init( )" function. These functions, or similar functions, may be also be available to virtual machine manager 80. For example, these functions, or similar functions, may be defined for a hypervisor and stored in a kernel buffer.

In some embodiments, virtual machine 90 or 400 may access and/or communicate one or more portions of device information 52, 200, 304, or 406. For example, a userspace program may read one or more portions of the SLIT information from the kernel buffer (e.g., by using a "copy_to_user" function) and transfer the received data from the kernel buffer to virtual machine 90 (e.g., by using one or more sockets). As another example, virtual machine manager 80 or 300 may pass device information 52 or 200 to a virtual BIOS of virtual machine 90 or 400. Guest operating system 402 may then read this information from the virtual BIOS and store it as device information 406.

At step 510, in some embodiments, information handling system 10 accesses virtual machine information 302 associated with virtual machine 400. This information may indicate whether virtual machine 400 is configured to communicate with device 30 without utilizing device drivers 72 of host operating system 70. For example, information handling system 10 may determine whether guest operating system 402 has one or more drivers that are configured to communicate directly with device 30 or 32. As another example, any suitable component of information handling system 10 may access a parameter of virtual machine manager 80 or 300, a parameter of virtual machine 90 or 400, or a parameter of any other suitable component to determine whether virtual machine 90 or 400 is configured for device passthrough.

At step 520, in some embodiments, information handling system 10 automatically selects processor 22*a* or processor 22*b* based on the accessed position information and virtual machine information. For example, information handling system 10 may analyze virtual machine information 302 and determine that virtual machine 400 is configured for passthrough for device 30. Information handling system 10 may analyze the position information (e.g., device information 52, 200, 304, or 406) and determine that processor 22*a* is able to access device 30 faster than processor 22*b*. Based on this determination, information handling system 10 may select processor 22*a*, in which case step 530 is performed. Conversely, if information handling system 10 determines that processor 22*b* is able access device 30 faster than processor 22*a*, it may select processor 22*b*, in which case step 540 is performed. Information handling system 10 may also consider various additional factors, such as resource availability and policy guidelines, when selecting between processors 22*a* and 22*b*. Information handling system 10 may also consider whether virtual machine 400 is configured to communicate directly with multiple devices that have different optimal processors.

In some embodiments, step 520 may be performed by virtual machine manager 80 or 300. For example, virtual machine manager 80 may select a processor from processors 22*a* and 22*b* that is nearest to a device, such as device 30 or 32, for which virtual machine 90 is configured for passthrough communication. As a particular example, a hypervisor may use device information 52, 200, or 304 to select a NUMA node (e.g., NUMA node 20*a* or 20*b* of FIG. 1) that can service the passthrough device's input/output requests faster. This NUMA node may be the NUMA node that contains the processor (e.g., processor 22*a* or 22*b* of FIG. 1) that is closer to the device.

In other embodiments, step 520 may be performed by guest operating system 402. For example, guest operating system 402 may utilize the information accessed in step 500 to select a processor (e.g., processor 22*a* or 22*b*) that is closer to the passthrough device. As another example, an interrupt request ("IRQ") balance daemon of guest operating system 402 (e.g., the irqbalance daemon of certain LINUX operating systems) may utilize device information 406 to select the processor. In certain embodiments, virtual machine manager 80 may not initiate a migration of virtual machine 90 unless notified by virtual machine 90.

At step 530, in some embodiments, information handling system 10 associates virtual machine 400 with processor 22*a*. Associating virtual machine 400 with processor 22*a* may cause instructions initiated by virtual machine 400 to be executed by processor 22*a*. In some embodiments, this may involve associating virtual machine 400 with NUMA node 20*a*. Virtual machine 400 may have been previously associated with a different processor (or a different NUMA node), in which case virtual machine 400 is migrated to the selected processor at step 530. For example, virtual machine manager 400 may assess whether the current NUMA node of virtual machine 400 is different from NUMA node 20*a* and, if so, migrate virtual machine 400 to NUMA node 20*a*.

At step 540, in some embodiments, information handling system 10 associates virtual machine 400 with processor 22*b*. Associating virtual machine 400 with processor 22*b* may cause instructions initiated by virtual machine 400 to be executed by processor 22*b*. In some embodiments, this may involve associating virtual machine 400 with NUMA node 20*b*. Virtual machine 400 may have been previously associated with a different processor (or a different NUMA node), in which case virtual machine 400 is migrated to the selected processor at step 540. For example, virtual machine manager 400 may assess whether the current NUMA node of virtual machine 400 is different from NUMA node 20*b* and, if so, migrate virtual machine 400 to NUMA node 20*b*.

Associating virtual machines with processors in this manner may allow for the use of device proximity information to more effectively optimize performance in a virtualized environment. Associating virtual machines with processors in this manner may also allow virtual machines to communicate more efficiently with underlying physical devices.

Figure 6:
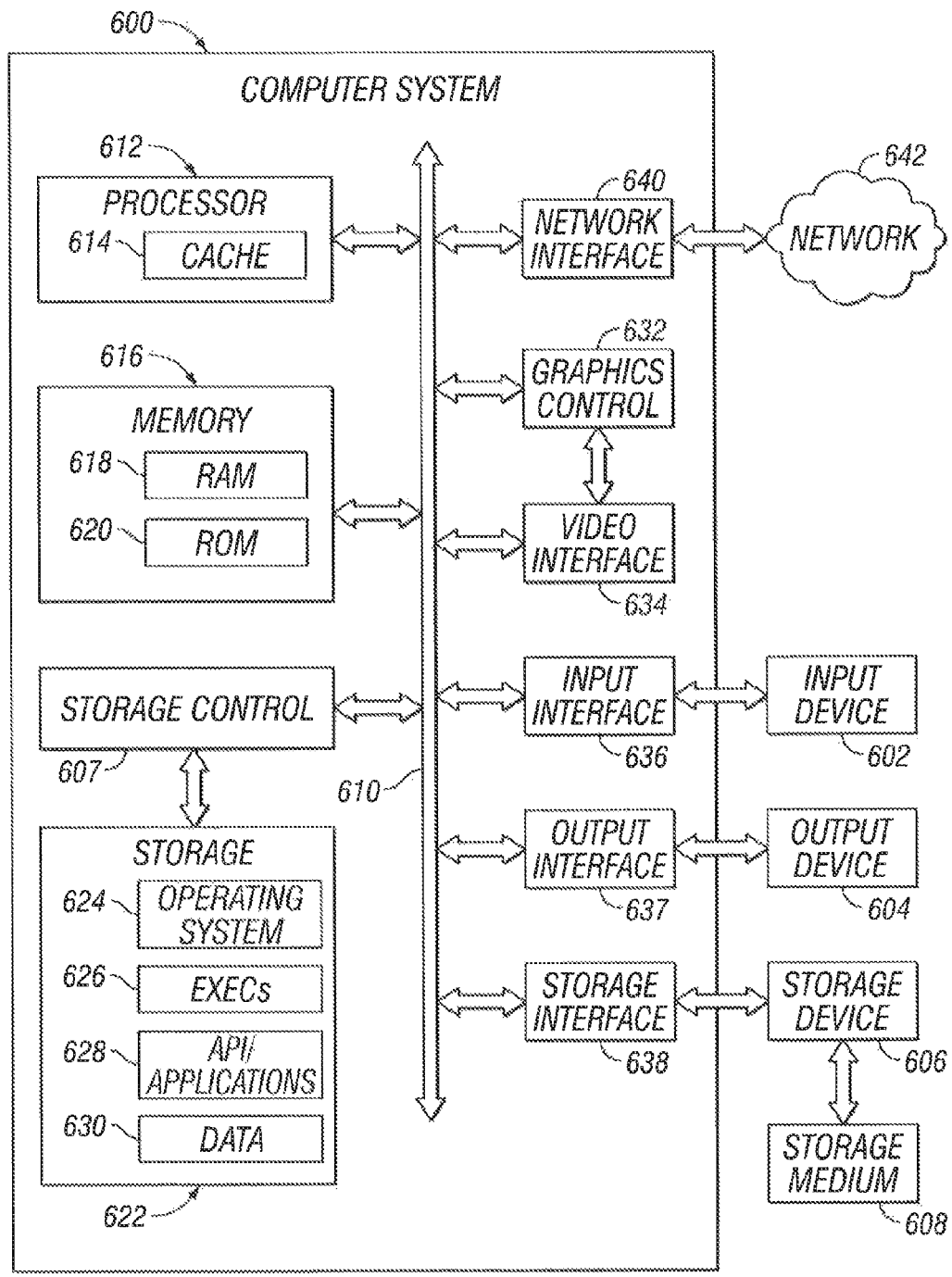
FIG. 6 illustrates one embodiment of an information handling system suitable for implementing one or more aspects of this disclosure.

FIG. 6 illustrates one embodiment of an information handling system suitable for implementing one or more aspects of this disclosure. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. Furthermore, any of these components may be used to implement information handling system 10 or any of the components included in FIGS. 1-5 or their corresponding descriptions.

Although the present disclosure describes and illustrates a particular computer system 600 having particular components in a particular configuration, the present disclosure contemplates any suitable computer system having any suitable components in any suitable configuration. Moreover, computer system 600 may have take any suitable physical form, such as for example one or more integrated circuit (ICs), one or more printed circuit boards (PCBs), one or more handheld or other devices (such as mobile telephones or personal digital assistants), one or more personal computers, or one or more super computers. Components discussed above with respect to FIGS. 1-5 (e.g., processors 22*a* and 22*b*; memories 24*a*, 24*b*, and 60; devices 30 and 32; BIOS 50; operating system 70; virtual machine manager 300; and virtual machine 400) may be implemented using all of the components, or any appropriate combination of the components, of computer system 600 described below.

Computer system 600 may have one or more input devices 602 (which may include a keypad, keyboard, mouse, stylus, etc.), one or more output devices 604 (which may include one or more displays, one or more speakers, one or more printers, etc.), one or more storage devices 606, and one or more storage medium 608. An input device 602 may be external or internal to computer system 600. An output device 604 may be external or internal to computer system 600. A storage device 606 may be external or internal to computer system 600. A storage medium 608 may be external or internal to computer system 600.

System bus 610 couples subsystems of computer system 600 to each other. Herein, reference to a bus encompasses one or more digital signal lines serving a common function. The present disclosure contemplates any suitable system bus 610 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 600 includes one or more processors 612 (or central processing units (CPUs)). A processor 612 may contain a cache 614 for temporary local storage of instructions, data, or computer addresses. Processors 612 are coupled to one or more storage devices, including memory 616. Memory 616 may include random access memory (RAM) 618 and read-only memory (ROM) 620. Data and instructions may transfer bidirectionally between processors 612 and RAM 618. Data and instructions may transfer unidirectionally to processors 612 from ROM 620. RAM 618 and ROM 620 may include any suitable computer-readable storage media. For example, aspects of this paragraph may be used to implement stored information discussed with respect to FIGS. 1-5 (e.g., device information 200).

Computer system 600 includes fixed storage 622 coupled bi-directionally to processors 612. Fixed storage 622 may be coupled to processors 612 via storage control unit 607. Fixed storage 622 may provide additional data storage capacity and may include any suitable computer-readable storage media. Fixed storage 622 may store an operating system (OS) 624, one or more executables (EXECs) 626, one or more applications or programs 628, data 630 and the like. Fixed storage 622 is typically a secondary storage medium (such as a hard disk) that is slower than primary storage. In appropriate cases, the information stored by fixed storage 622 may be incorporated as virtual memory into memory 616. For example, aspects of this paragraph may be used to implement stored information discussed in FIGS. 1-5 (e.g., device information 200).

Processors 612 may be coupled to a variety of interfaces, such as, for example, graphics control 632, video interface 634, input interface 636, output interface 637, and storage interface 638, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 640 may couple processors 612 to another computer system or to network 642. Network interface 640 may include wired, wireless, or any combination of wired and wireless components. Such components may include wired network cards, wireless network cards, radios, antennas, cables, or any other appropriate components. With network interface 640, processors 612 may receive or send information from or to network 642 in the course of performing steps of particular embodiments. Particular embodiments may execute solely on processors 612. Particular embodiments may execute on processors 612 and on one or more remote processors operating together.

In a network environment, where computer system 600 is connected to network 642, computer system 600 may communicate with other devices connected to network 642. Computer system 600 may communicate with network 642 via network interface 640. For example, computer system 600 may receive information (such as a request or a response from another device) from network 642 in the form of one or more incoming packets at network interface 640 and memory 616 may store the incoming packets for subsequent processing. Computer system 600 may send information (such as a request or a response to another device) to network 642 in the form of one or more outgoing packets from network interface 640, which memory 616 may store prior to being sent. Processors 612 may access an incoming or outgoing packet in memory 616 to process it, according to particular needs.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 616 may include one or more computer-readable storage media embodying software and computer system 600 may provide particular functionality described or illustrated herein as a result of processors 612 executing the software. Memory 616 may store and processors 612 may execute the software. Memory 616 may read the software from the computer-readable storage media in mass storage device 616 embodying the software or from one or more other sources via network interface 640. When executing the software, processors 612 may perform one or more steps of one or more processes described or illustrated herein, which may include defining one or more data structures for storage in memory 616 and modifying one or more of the data structures as directed by one or more portions the software, according to particular needs. In addition or as an alternative, computer system 600 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Herein, reference to a computer-readable non-transitory storage medium may include a semiconductor-based or other integrated circuit (IC), such as for example a field-programmable gate array (FPGA) or an application-specific IC (ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable medium, or a suitable combination of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method executed by at least one processor comprising:
    accessing a first information, the first information comprising a first parameter and a second parameter, the first parameter associated with a position of a Peripheral Component Interconnect express ("PCIe") device relative to a first processor associated with a first non-uniform memory access node, the second parameter associated with a position of the PCIe device relative to a second processor associated with a second non-uniform memory access node;
    causing a virtual machine associated with the second processor to store the first information on the virtual machine, the virtual machine configured to run on a host operating system, the virtual machine comprising a guest operating system configured to communicate with the PCIe device;
    accessing a second information associated with the virtual machine, the second information describing capabilities of the guest operating system of the virtual machine to communicate with the PCIe device directly without utilizing device drivers of the host operating system; and
    in response to the guest operating system determining,
        based at least on the second information, that the guest operating system is configured for direct communication with the PCIe device, and
        based at least on the first information, that the PCIe device is closer in proximity to the first processor than the second processor,
    associating the virtual machine with the first processor, wherein associating the virtual machine with the first processor causes instructions initiated by the virtual machine to be executed by the first processor.

2. The method of claim 1, wherein:
    the first parameter is a distance between the PCIe device and the first processor;
    the second parameter is a distance between the PCIe device and the second processor; and
    the first information comprises a System Locality Information Table.

3. The method of claim 1, wherein associating the virtual machine with the first processor comprises associating the virtual machine with the first non-uniform memory access node.

4. The method of claim 3, wherein the virtual machine is associated with a non-uniform memory access node other than the first non-uniform memory access node before the association of the virtual machine with the first non-uniform memory access node.

5. The method of claim 1, wherein associating the virtual machine with the first processor is performed by a virtual machine manager.

6. The method of claim 1, wherein associating the virtual machine with the first processor is performed by the virtual machine.

7. The method of claim 1, wherein causing the virtual machine to store the first information comprises causing the virtual machine to store the first information on a virtual Basic Input/Output System ("BIOS").

8. A non-transitory computer-readable storage medium comprising instructions, that, when executed by at least one processor, are configured to:
    access a first information, the first information comprising a first parameter and a second parameter, the first parameter associated with a position of a Peripheral Component Interconnect express ("PCIe") device relative to a first processor associated with a first non-uniform memory access node, the second parameter associated with a position of the PCIe device relative to a second processor associated with a second non-uniform memory access node;
    cause a virtual machine associated with the second processor to store the first information on the virtual machine, the virtual machine configured to run on a host operating system, the virtual machine comprising a guest operating system configured to communicate with the PCIe device;
    access a second information associated with the virtual machine, the second information describing capabilities of the guest operating system of the virtual machine to communicate with the PCIe device directly without utilizing device drivers of the host operating system; and
    in response to the guest operating system determining,
        based at least on the second information, that the guest operating system is configured for direct communication with the PCIe device, and
        based at least on the first information, that the PCIe device is closer in proximity to the first processor than the second processor,
    associate the virtual machine with the first processor, wherein the association of the virtual machine with the first processor causes instructions initiated by the virtual machine to be executed by the first processor.

9. The medium of claim 8, wherein:
    the first parameter is a distance between the PCIe device and the first processor;
    the second parameter is a distance between the PCIe device and the second processor; and the first information comprises a System Locality Information Table.

10. The medium of claim 8, wherein
the instructions are configured to associate the virtual machine with the first processor by associating the virtual machine with the first non-uniform memory access node.

11. The medium of claim 10, wherein the virtual machine is associated with a non-uniform memory access node other than the first non-uniform memory access node before the association of the virtual machine with the first non-uniform memory access node.

12. The medium of claim 8, wherein associating the virtual machine with the first processor is performed by a virtual machine manager.

13. The medium of claim 8, wherein associating the virtual machine with the first processor is performed by the virtual machine.

14. The medium of claim 8, wherein the instructions are configured to cause the virtual machine to store the first information by causing the virtual machine to store the first information on a virtual Basic Input/Output System ("BIOS").

15. A system comprising:
a computer-readable storage medium comprising:
a first information, the first information comprising a first parameter and a second parameter, the first parameter associated with a position of a Peripheral Component Interconnect express ("PCIe") device relative to a first processor associated with a first non-uniform memory access node, the second parameter associated with a position of the PCIe device relative to a second processor associated with a second non-uniform memory access node; and
a second information associated with a virtual machine, the virtual machine configured to run on a host operating system and being associated with the second processor, the virtual machine comprising a guest operating system configured to communicate with the PCIe device, the second information describing capabilities of the guest operating system of the virtual machine to communicate with the PCIe device directly without utilizing device drivers of the host operating system; and
a plurality of processors comprising the first processor and the second processor;

wherein at least one processor of the plurality of processors is configured to:
access the first information;
cause the virtual machine to store the first information on the virtual machine;
access the second information;
in response to the guest operating system determining, based at least on the second information, that the guest operating system is configured for direct communication with the PCIe device, and based at least on the first information, that the PCIe device is closer in proximity to the first processor than the second processor, associate the virtual machine with the first processor, wherein associating the virtual machine with the first processor causes instructions initiated by the virtual machine to be executed by the first processor.

16. The system of claim 15, wherein:
the first parameter is a distance between the PCIe device and the first processor;
the second parameter is a distance between the PCIe device and the second processor; and
the first information comprises a System Locality Information Table.

17. The system of claim 15, wherein
the at least one processor of the plurality of processors is configured to associate the virtual machine with the first processor by associating the virtual machine with the first non-uniform memory access node.

18. The system of claim 17, wherein the virtual machine is associated with a non-uniform memory access node other than the first non-uniform memory access node before the association of the virtual machine with the first non-uniform memory access node.

19. The system of claim 15, wherein associating the virtual machine with the first processor is performed by a virtual machine manager.

20. The system of claim 15, wherein associating the virtual machine with the first processor is performed by the virtual machine.

21. The system of claim 15, wherein the at least one processor is configured to cause the virtual machine to store the first information by causing the virtual machine to store the first information on a virtual Basic Input/Output System ("BIOS").

\* \* \* \* \*